United States Patent

Noutomi et al.

[11] Patent Number: 6,070,892
[45] Date of Patent: Jun. 6, 2000

[54] SUSPENSION SYSTEM WITH AN IMPROVED COUPLING STRUCTURE BETWEEN TORSION BAR AND SUSPENSION ARM

[75] Inventors: Shinya Noutomi; Takashi Tsutsumi, both of Kanagawa-ken, Japan

[73] Assignee: Nissan Motor Co., Ltd., Kanagawa-ken, Japan

[21] Appl. No.: 08/942,723

[22] Filed: Oct. 2, 1997

[30] Foreign Application Priority Data

Oct. 2, 1996 [JP] Japan .................................. 8-261934

[51] Int. Cl.[7] .................................................. B60G 11/20
[52] U.S. Cl. ............................ 280/124.137; 280/124.167; 267/274
[58] Field of Search ...................... 280/124.137, 124.167, 280/124.166, FOR 115, FOR 152, FOR 157; 267/274, 273

[56] References Cited

U.S. PATENT DOCUMENTS 4,327,927  5/1982  Tanaka et al. .................... 280/124.137
4,570,969  2/1986  Tsutsumi et al. ................. 280/124.137

OTHER PUBLICATIONS pp. 56–59 in vol. 11, of Jidousha Kougaku Zensho (A Complete Book Of Automobile Engineering) Pub. From Kabushiki Kaisha Aug. 20, 1980.

*Primary Examiner*—Peter C. English
*Attorney, Agent, or Firm*—McDermott, Will & Emery

[57] ABSTRACT

One end of a pivotal spindle for a suspension arm and one end of a torsion bar as a suspension spring are commonly joined to a serrated central part of a torque arm whose one end is bolted to a contacting wall part of the suspension arm and whose other end is fastened to a spaced wall part of the suspension arm by applying a nut on a bolting part formed on an end face of a poppet-like pin member projecting from the spaced wall part.

20 Claims, 7 Drawing Sheets

SUSPENSION SYSTEM WITH AN IMPROVED COUPLING STRUCTURE BETWEEN TORSION BAR AND SUSPENSION ARM

The contents of Application No. TOKUGANHEI 8-261934, filed Oct. 2, 1996, in Japan are hereby incorporated by reference.

BACKGROUND OF THE INVENTION

1. Field of the Invention

The present invention relates to a suspension system for vehicles. In particular, it relates to a suspension system for vehicles that includes: a torsion bar; a suspension arm which is supported to a vehicle body end (i.e. to an end of a vehicle body, as it collectively means an adequate number of integral parts of the vehicle body and an adequate number of rigid members fixed relative to the vehicle body, as used herein) through a bush member; and a coupling structure for coupling the torsion bar to the suspension arm. The invention is addressed to an improvement of the coupling structure.

2. Description of Relevant Art

There are illustrated various examples of conventional suspension systems at pages 56–59 in Vol. 11 of JIDOUSHA KOUGAKU ZENSHO (a complete book of automobile engineering) published from KABUSHIKI KAISHA (a corporation) SANKAIDO, Japan, on Aug. 20, 1980.

Figure 1:
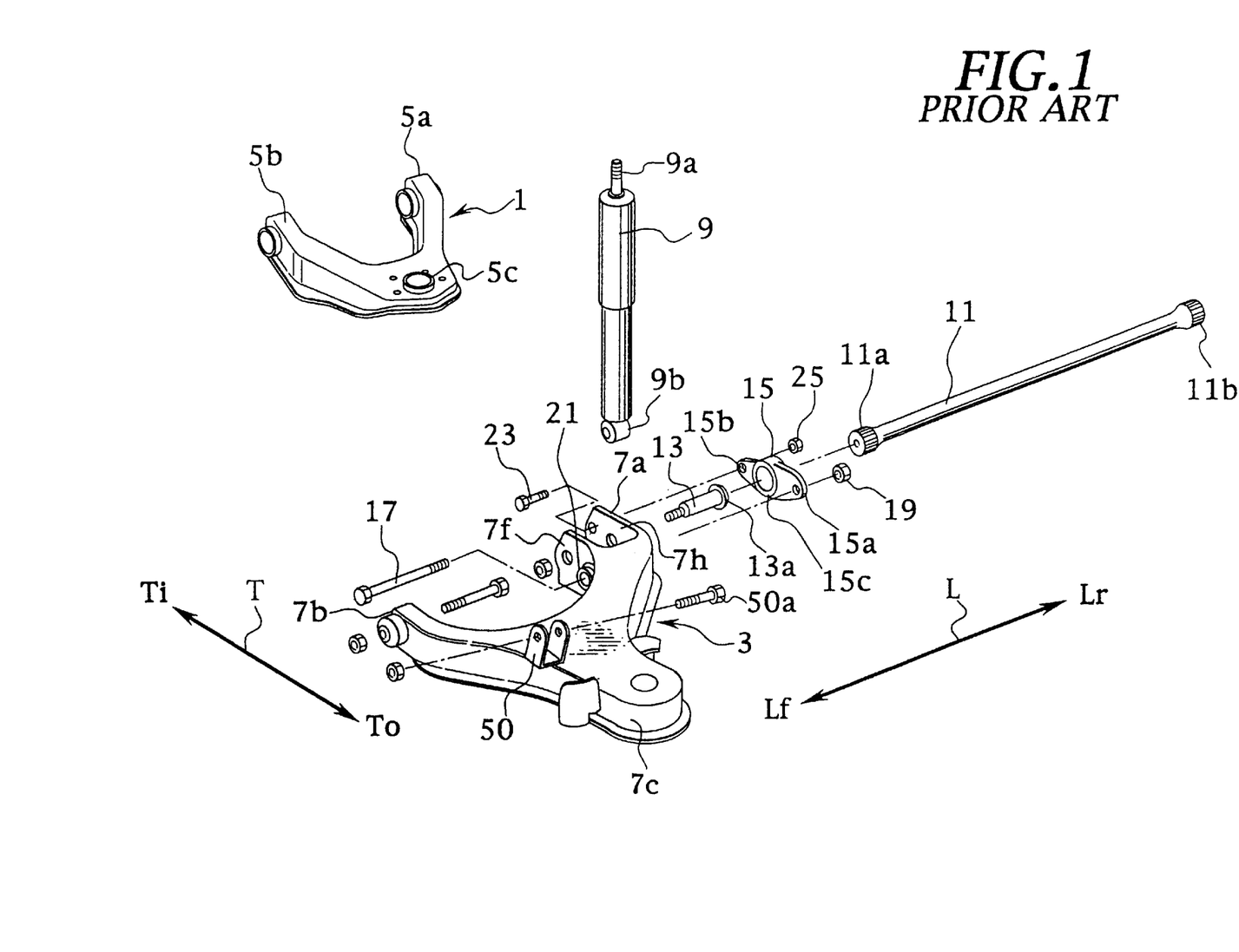
FIG. 1 is an exploded view of a conventional suspension system.

In the Accompanying Drawings, FIG. 1 shows a typical conventional independent suspension system applicable to a right front wheel of an automobile.

This conventional suspension system includes a torsion bar 11 employed as a suspension spring member. Further, it has a combination of an upper arm 1 and a lower arm 3 as a pair of suspension arms shaped in wishbone forms and arranged in a vertically opposing manner.

The upper and lower arms 1 and 3 are each shaped in a wishbone form. They are both vertically swingable. When installed in a vehicle, they extend substantially horizontally, i.e. in a longitudinal direction L and a transverse direction T of the vehicle. In the figure, designated by reference characters Lf and Lr are forward and rearward senses of the longitudinal direction L, respectively, and Ti and To are inward and outward senses of the transverse direction T, respectively.

The arms 1 and 3 have their transversely inner portions longitudinally bifurcated into front fixing parts 5b and 7b and rear fixing parts 5a and 7a. The front and rear fixing parts 5b, 7b and 5a, 7a are each supported to a vehicle body end through a corresponding unshown pivotal bush member. An unshown single upper link spindle is inserted at both ends thereof into unshown upper link bushes fitted in the front and rear fixing parts 5b, 5a of the upper arm 1. The arms 1 and 3 have their transversely outer portions 5c and 7c provided with unshown upper and lower ball joints, respectively, which ball joints cooperate with each other for rotatably supporting an unshown steering knuckle member to thereby support an unshown road wheel.

A shock absorber 9, which is connected at an upper end 9a thereof to a vehicle body end, is pivoted at a lower end 9b thereof on a bolt 50a fastened to a bracket 50 on a transversely intermediate portion of the lower arm 3.

The torsion bar 11 has a serrated front end part 11a coupled to the rear fixing part 7a of the lower arm 3, and a serrated rear end part 11b fixed to a vehicle body end.

Figure 2:
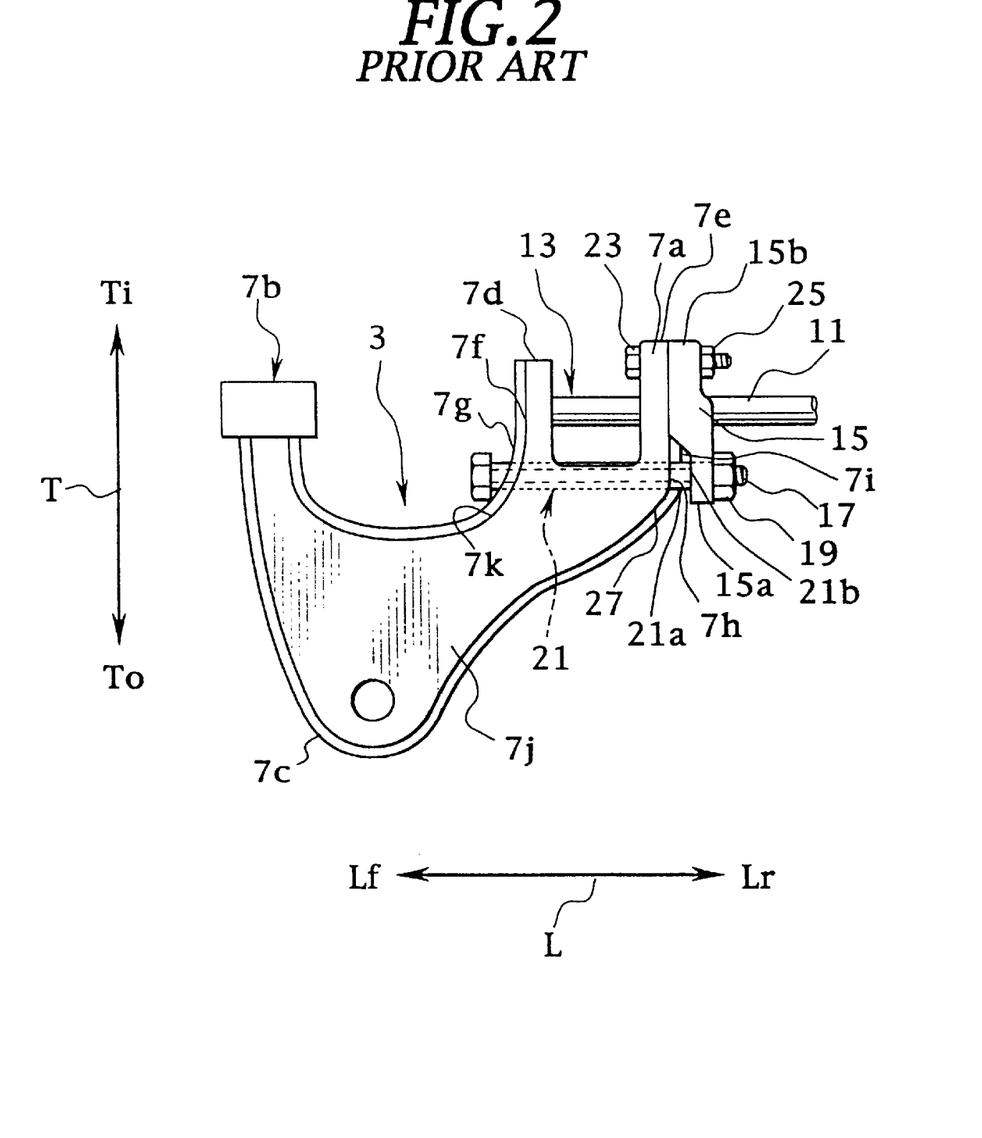
FIG. 2 is a plan of an essential portion of the suspension system of FIG. 1.

FIG. 2 shows in plan a coupling structure between the torsion bar 11 and the lower arm 3.

The rear fixing part 7a of the lower arm 3 is further bifurcated in the longitudinal direction L to have a pair of front and rear projections 7d and 7e extending in the inward sense Ti. The front projection 7d comprises a transversely extending vertical wall 7f, which is bent at a lower edge thereof in the forward sense Lf to provide a narrow horizontal flange 7g and at an upper edge thereof in the rearward sense Lr to be joined to a horizontal top wall 7j of the lower arm 3. The vertical wall 7f of the front projection 7d constitutes part of a forwardly curved front side wall 7k of the rear fixing part 7a of the lower arm 3. Likewise, the rear projection 7e comprises a transversely extending vertical wall 7h, which is bent at a lower edge thereof in the rearward sense Lr to provide a narrow horizontal flange 7i and at an upper edge thereof in the forward sense Lf to be joined to the top wall 7j of the lower arm 3. The vertical wall 7h of the rear projection 7e constitutes part of a forwardly curved rear side wall 27 of the rear fixing part 7a.

The vertical walls 7f and 7h of the front and rear projections 7d and 7e are interconnected to each other at their transversely intermediate parts by a longitudinally extending spindle 13, which is inserted therethrough in the forward sense Lf from outside the rear projection wall 7h (see FIG. 1) and fastened thereto with a nut. The spindle 13 is coupled through an unshown bush member to a vehicle body end. The spindle 13 has at its rear end a serrated head part 13a facing a rear outside of the wall 7h of the rear projection 7e.

The rear outside of the wall 7h provides a mount place for a butterfly-like torque-bearing joint member 15 called "torque arm".

The torque arm 15 comprises a longitudinally extending cylindrical hollow part 15c, a first wing 15a as an integral arm part extending in the outward sense To, and a second wing 15b as an integral arm part extending in the inward sense Ti. The first wing 15a is offset in the rearward sense Lr relative to the second wing 15b, so that a significant gap is left between a front face of the first wing 15a and a curved outside of the rear side wall 27 of the rear fixing part 7a, when the torque arm 15 is set in position.

The torque arm 15 is fixed to the rear fixing part 7a of the lower arm 3, using a relatively long first bolt 17 and an associated nut 19 for fastening the first wing 15a and a relatively short second bolt 23 and an associated nut 25 for fastening the second wing 15b. The second bolt 23 may be paired.

The first bolt 17 is inserted in the rearward sense Lr from ahead of the front side wall 7k of the rear fixing part 7a, through a torque arm collar 21 and a thru-hole formed in the first wing 15a.

The torque arm collar 21 is provided through the rear fixing part 7a of the lower arm 3, extending in parallel to the spindle 13. The collar 21 is welded to be fixed to the lower arm 3. A rear part 21a of the collar 21 protrudes outside the rear side wall 27 of the rear fixing part 7a, and has a rear end face 21b formed as an abutment surface for the fastening of the first wing 15a.

As the first bolt 17 is inserted through the collar 21 and tightened by the nut 19, the first wing 15a of the torque arm 15 is fastened against the end face 21b of the collar 21.

The second wing 15b of the torque arm 15 is securely fastened to the rear projection 7e, by the second bolt 23 tightened with the nut 25.

The use of torque arm collar 21 ensures a fastened fixing of the torque arm 15 by the provision of a fastening oriented surface (21b) between the first wing 15a of the torque arm 15 and the rear side wall 27 of the fixing part 7a of the lower arm 3. The rear side wall 27 is curved, as the lower arm 3 has a restricted configuration in relation to the road wheel. A secured fastening of the torque arm 15 to the lower arm 3 is thus permitted by the torque arm collar 21.

In the torque arm 15, the hollow part 1 5c is serrated at a front end thereof for an anti-rotational coupling with the head part 13a of the spindle 13 and at a rear end thereof for an anti-rotational coupling with the front end part 11a of the torsion bar 11. The respective anti-rotational coupling may be otherwise achieved.

The front end part 11a of the torsion bar 11 is concentrically aligned to a pivotal axis of the spindle 13, so that the torsion bar 11 is twisted by the torque arm 15 relative to a vehicle body end, i.e. between both end parts 11a and 11b thereof, when the lower arm 3 is caused to vertically swing about the pivotal axis, together with the torque arm 15. The torsion bar 11 thus effectively functions as a suspension spring member.

The conventional suspension system described however employs a multiplicity of component parts, with a reduced efficiency of assembly work and a needed high processing accuracy notwithstanding an associated increase in accuracy of assembly subjected to an unavoidable limitation.

In other words, in the conventional structure, the torque arm 15 is assembled to the lower arm 3 by using the first bolt 17 inserted in the collar 21. The torque arm 15 is thus assembled with an accuracy subjected to a fixing error of the collar 21 relative to the lower arm 3 and a fitting error between the collar 21 and the first bolt 17, in addition to a fixing error of the spindle 13 relative to the lower arm 3. The accuracy in assembly of the torque arm 15 depends on a total of such errors.

To reduce the total of such errors, one may minimize the fixing error of the spindle 13 relative to the lower arm 3. This measure however needs an increased accuracy in processing holes for fixing the spindle 13 in the lower arm 3. The processing will be complicated.

The fixing holes for spindle 13 may be successfully processed with an increased accuracy. However, a resultant structure is still subject to a reduced accuracy due to a clearance between the first bolt 17 and the collar 21. It is limited for the assembly accuracy to be increased with a reduced total of errors.

The conventional structure needs additional work for the torque arm 15 to be fastened with the first bolt 17 fitted in the collar 21 and tightened with the nut 19. The assembly efficiency is reduced by the multiplicity of component parts.

SUMMARY OF THE INVENTION

The present invention has been achieved with such points in view.

It therefore is an object of the present invention to provide a suspension system for vehicles with a reduced number of component parts including a special member permitting an increased assembly efficiency, a facilitated processing and an increased assembly accuracy.

To achieve the object, an aspect of the present invention provides a suspension system for vehicles including: a suspension arm having a fixing part for a fixing thereof to a vehicle body end; a spindle member provided in the fixing part of the suspension arm; a bush member for coupling the spindle member to the vehicle body end to have the fixing part of the suspension arm supported to the vehicle body end; a torque arm member fastened at one of opposite end parts thereof to an outside of the suspension arm, the torque arm member including an intermediate part having a pair of insert parts concentrically provided opposite sides thereof; the spindle member having an end part thereof projecting past the outside of the suspension arm and inserted in one of the insert parts in an anti-rotational manner; a torsion bar having an end part thereof inserted in the other of the insert parts in an anti-rotational manner; a pin member fixed to the fixing part of the suspension arm in parallel to the spindle member, the pin member having an end part thereof projecting past the outside of the suspension arm, the end part of the pin member being provided with a fastening-oriented surface having a bolting part projecting therefrom, the bolting part extending through the other of the opposite end parts of the torque arm member; and a nut member applied to the bolting part at the end part of the pin member so that the other of the opposite end parts of the torque arm member is fastened to the outside of the suspension arm.

According to the aspect of the invention, a pin member fixed to a fixing part of a suspension arm provides a surface adaptive for a fastening of a torque arm member thereto such that a bolting part projecting from the surface is inserted through an end part of the torque arm member and tightened with a nut member applied thereon to secure the end part to the surface.

Accordingly, the end part of the torque arm member can be assembled in a complete form simply by applying the nut member, without employing a conventional bolt fitted in a collar. The torque arm member has an increased assembly accuracy without a conventional backlash due to a clearance between a bolt and a collar. The assembly accuracy is merely subjected to a fixing error of the pin member to the suspension arm in addition to that of a spindle member.

An assembly efficiency is increased, without a step for inserting a conventional bolt through a collar fixed to a suspension arm. Moreover, a suspension system is composed of a reduced number of component parts. Without conventional considerations to an assembly error due to a clearance between a bolt and a collar, there is allowed a reduction in processing accuracy of a hole for fixing the spindle member to the suspension arm, permitting a facilitated processing. The assembly accuracy is improved as a whole.

Further, to achieve the object described, another aspect of the present invention provides a suspension system for a vehicle having a vehicle body, a plurality of rigid members secured to the vehicle body, a plurality of road wheels, and a plurality of steering knuckle members each respectively supporting a corresponding road wheel, the suspension system comprising: a first suspension arm vertically swingably operatively connected at an inner end portion thereof to a first rigid member, the first suspension arm being operatively joined at an outer end portion thereof to one end of an associated steering knuckle member; a second suspension arm vertically swingably operatively connected at an inner end portion thereof to a second rigid member, the second suspension arm being operatively joined at an outer end portion thereof to another end of the associated steering knuckle member; a shock absorber operatively connected at one end thereof to a third rigid member and at another end thereof to an integral part of one of the first and second suspension arms; a torsion bar connected at one end part thereof to a fourth rigid member in an anti-rotational manner; a torque arm member for holding another end part of the torsion bar to have the torsion bar twisted when the torque arm member is rotated about a rotational axis thereof, the torque arm member having a first extension extending in a radial direction about the rotational axis; and a fastening structure for fastening the torque arm member to a certain one of the inner end portions of the first and second suspension arms to have the torque arm member rotated together with the certain inner end portion when the corresponding suspension arm swings about a pivotal axis thereof, the fastening structure including a gap defined between the first extension and a spaced side wall of the certain inner end portion, a pin member fixed to the certain inner end portion, the pin member having an end part thereof projected through the spaced side wall to provide an end face for abutment with one side of the first extension, the end face being formed with a bolting part projecting therefrom, and a nut member applied to the bolting part at another side of the first extension.

According to this aspect of the invention, a road wheel is independently suspended from a vehicle body with a quadrilateral linkage composed of a pair of first and second swingable suspension arms, a steering knuckle member and the vehicle body. The quadrilateral linkage is elastically restricted in motion with a shock absorber interposed between either suspension arm and the vehicle body, and a torsion bar twistable with a torque arm member fastened to a corresponding suspension arm by a fastening structure. This structure has a gap between an extension of the torque arm member and a spaced side wall of the corresponding suspension arm, and includes a pin member that traverses or bridges the gap to provide a lifted mount face formed with a bolting part projecting therefrom.

Accordingly, there are achieved similar effects to the former aspect.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

There will be detailed below the preferred embodiments of the present invention with reference to the accompanying drawings. Like members are designated by like reference characters, eliminating redundant description.

Figure 3:
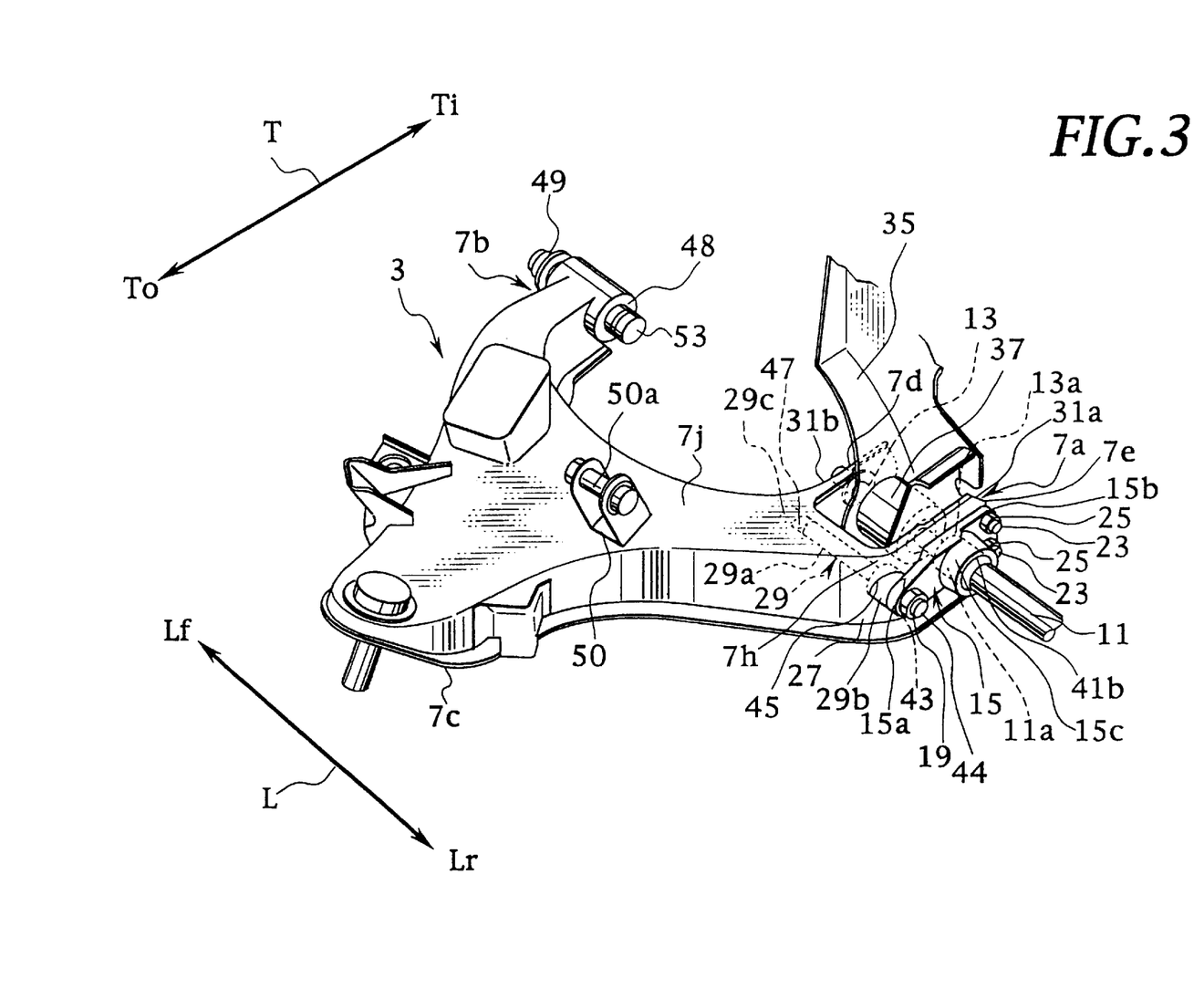
FIG. 3 is a perspective view of an essential portion of a suspension system according to an embodiment of the invention.
Figure 4:
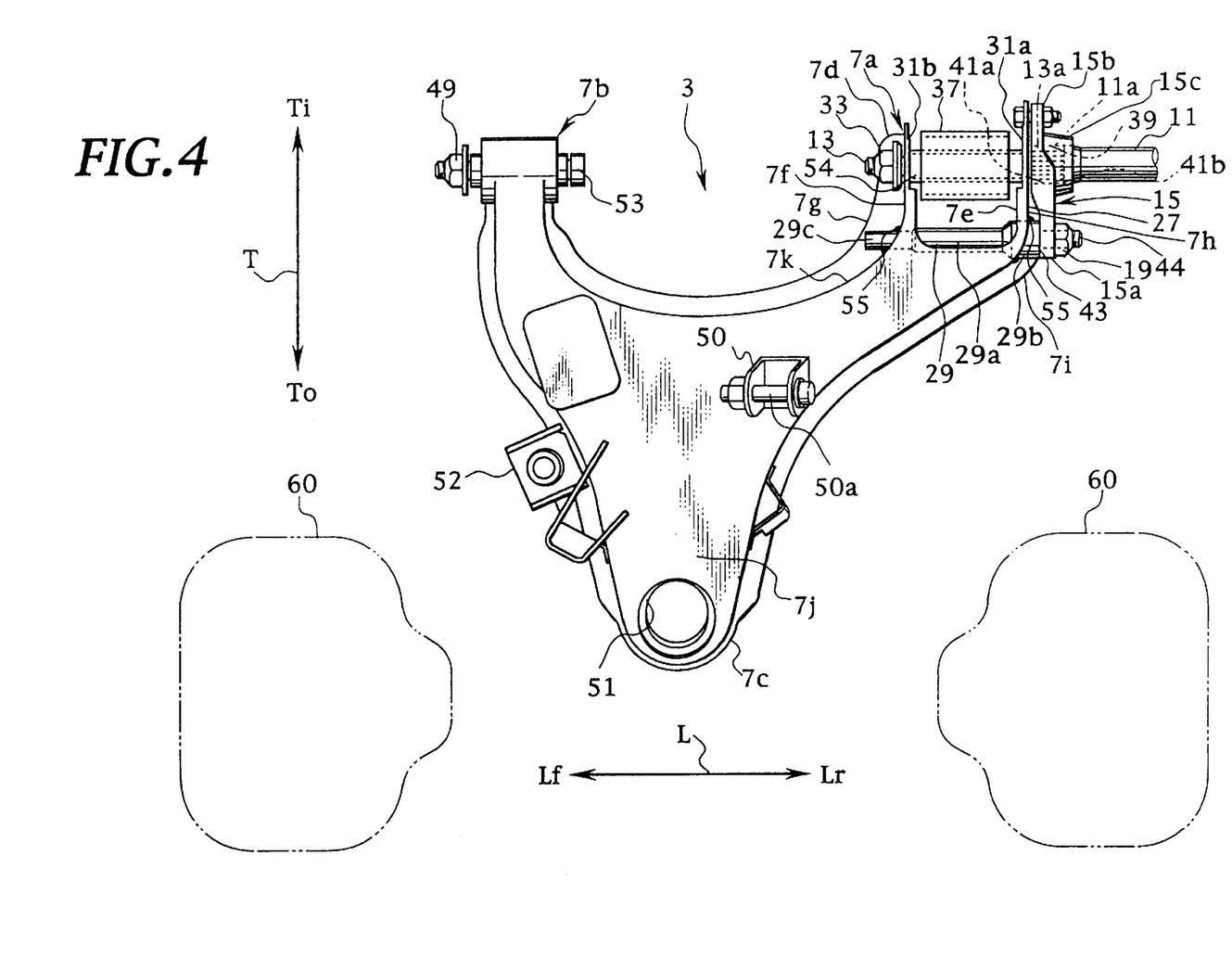
FIG. 4 is a plan of the essential portion of the suspension system of FIG. 3.
Figure 5:
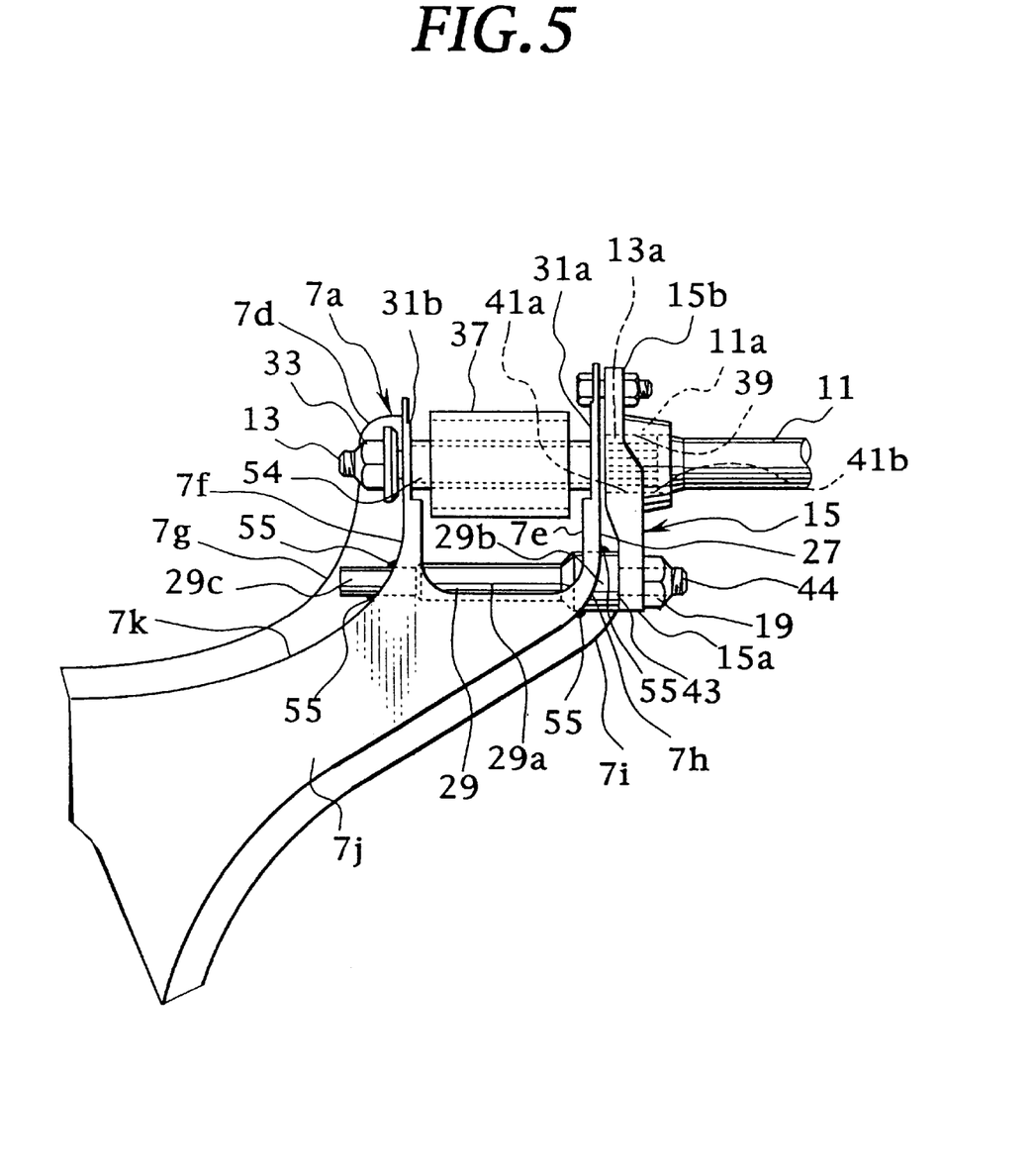
FIG. 5 is a detail of an essential part shown in FIG. 4.
Figure 6:
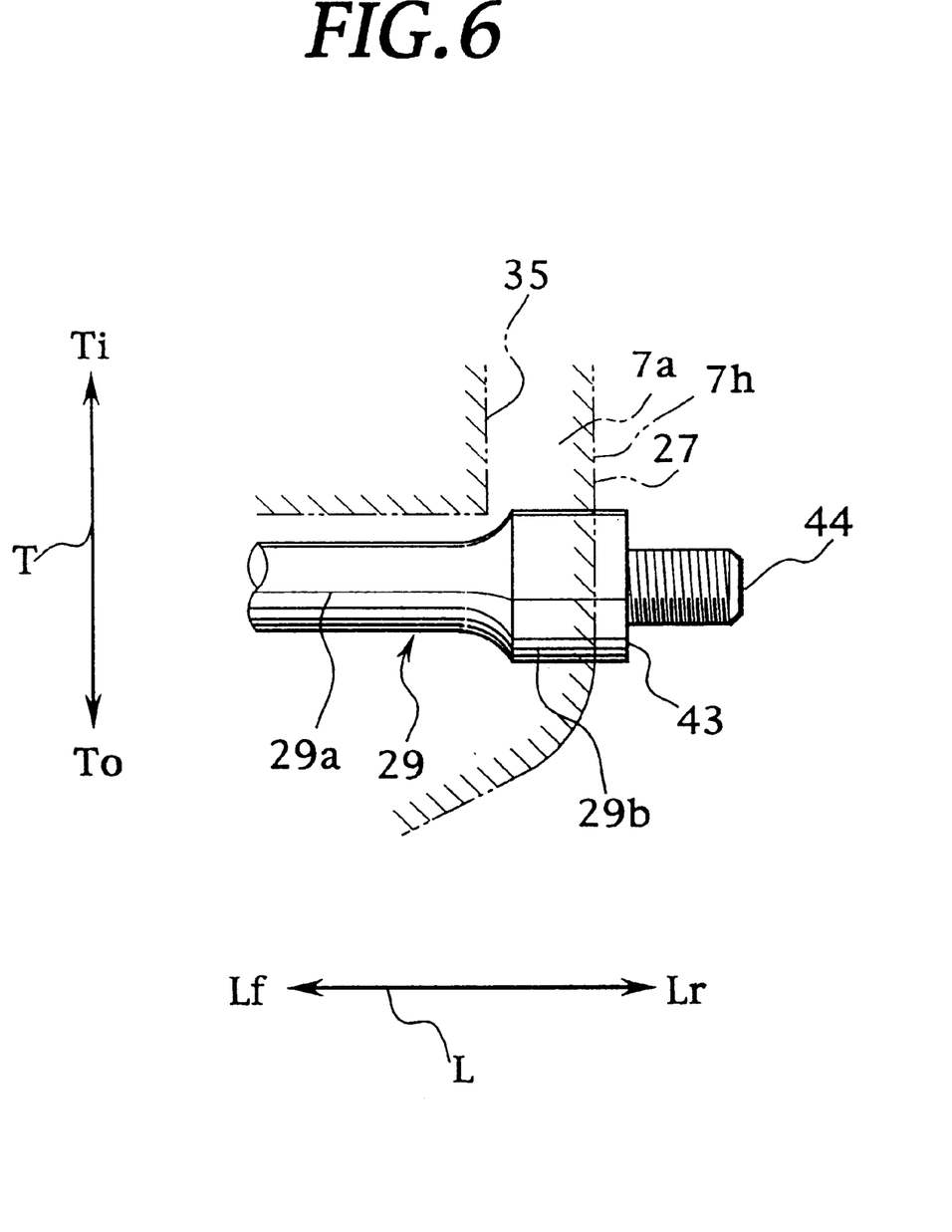
FIG. 6 is a detail of a pin shifted in position.
Figure 7A:
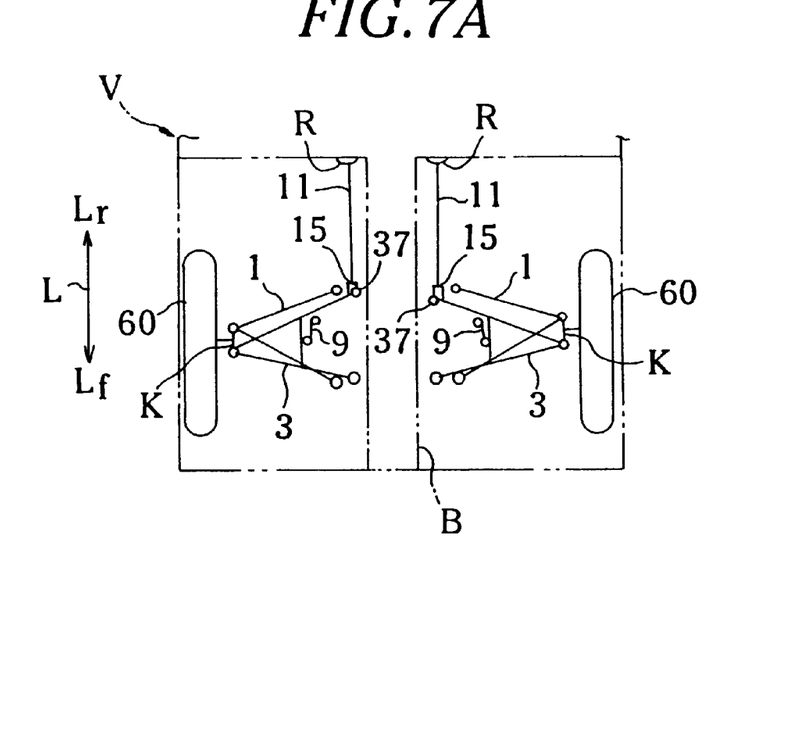
FIGS. 7A and 7B are front and top views in skeleton of a front portion of a vehicle including the suspension system of FIG. 3.
Figure 7B:
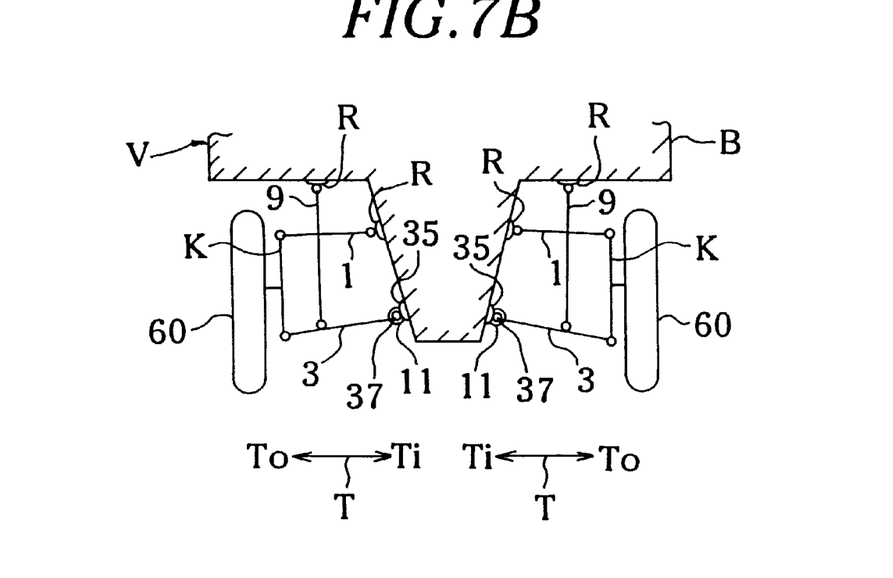

FIG. 3 shows an essential portion of a suspension system according to an embodiment of the invention, which system is analogous to the suspension system of FIG. 1, unless otherwise described herein. FIG. 4 is a plan of the essential portion of the suspension system of FIG. 3. FIGS. 5 and 6 are detail s. FIGS. 7A and 7B illustrate the suspension system in skeleton.

In the present embodiment, the invention is applied to a suspension system in a front part of an automobile that includes a lower arm 3 as one of paired suspension arms and a torsion bar 11 secured at a rear end part 11a thereof to a torque arm 15 fastened to a rear side wall 27 of a rear fixing part 7a of the lower arm 3. The embodiment has a pin 29 fixed to the rear fixing part 7a, and a first wing 15a of the torque arm 15 is fastened to be fixed to a rear end part 29b of the pin 29.

The lower arm 3 comprises a combination of panel or sheet members formed or pressed to define a vacant space thereunder. The rear fixing part 7a is shaped in a U-form in plan with a pair of front and rear support parts 31b, 31a opposing each other in a longitudinal direction L of the automobile. The front support part 31b comprises a front projection 7d of the rear fixing part 7a and necessary fittings. The rear support part 31a comprises a rear projection 7e of the rear fixing part 7a and necessary fittings. A spindle 13 is inserted through fixing holes formed in the support parts 31a, 31b, to be tightened with a nut 33. A collar 54 is fitted on the spindle 13 between vertical walls 7f, 7h of the front and rear projections 7d, 7e. An elastically operable bush member 37 is fixed on a longitudinally mediate part of the collar 54. The bush member 37 is fixed to both front and rear side parts of a U-shaped bracket 35 fixed to a vehicle body end. The fixing part 7a is thus supported to the vehicle body end, through the bush member 37. The lower arm 3 is vertically swingable about a pivotal axis thereof that coincides with a longitudinal centerline of the spindle 13.

The spindle 13 has a head part 13a as a diameter-enlarged rear end part thereof with serrations formed therearound. An entire length of the torsion bar 11 is arranged to be concentric to the spindle 13. The front end part 11a of the torsion bar 11 is formed with an identical diameter to the head part 13a of the spindle 13, and has serrations therearound.

The torque arm 15 has a coupling hole 39 provided through a central hollow part 15c thereof and formed with serrations. The central part 15c thus constitutes a pair of front and rear serrated insert parts 41a, 41b. The head part 13a of the spindle 13 is inserted in the front insert part 41a, to be coupled thereto in an anti-rotational manner by a normal or press-fitted serration engagement. The front end part 11a of the torsion bar 11 is inserted in the rear insert part 41b, to be likewise coupled thereto in an anti-rotational manner.

As best shown in FIG. 6, the rear end part 29b of the pin 29 has an end face 43 formed as a fastening-oriented surface at a rear side thereof. The first wing 15a of the torque arm 15 is fastened against the end face 43 of the pin 29. The pin 29 is provided through the fixing part 7a of the lower arm 3 in parallel with the spindle 13, and fixed to the lower arm 3. A longitudinally intermediate part 29a of the pin 29 is relatively small in diameter, i.e., it is reduced in diameter to have a spacing secured relative to the spindle 13, allowing for potential motions of the bracket 35 without interferences. The diameter of the pin 29 is progressively increased, as it approaches the rear end part 29b. The rear end part 29b has an enlarged diameter. The rear end part 29b is projected outside an associated part of the rear side wall 27 of the fixing part 7a, toward the first wing 15a of the torque arm 15, and ended with the end face 43. In FIGS. 3–5, the associated part of the rear side wall 27 is curved. However, in FIG. 6, it is flat, as the pin 29 is shifted toward the spindle 13. In either case, the associated wall part is spaced from the first wing 15a of the torque arm 15, with a gap left therebetween. The end face 43 has a bolting part 44 rewardly projecting therefrom. As best shown in FIG. 5, the pin has a front end part 29c projected outside curved part of a front side wall 7k of the fixing part 7a. The front end part 29c has a smaller diameter than the intermediate part 29a.

As shown in FIG. 3, the fixing part 7a of the lower arm 3 has an elliptic rear fitting hole 45 formed at the side of the rear support part 31a, i.e., in the curved part of the rear side wall 27. The rear fitting hole 45 has a size corresponding to the rear end part 29b of the pin 29. Further, the fixing part 7a has an elliptic front fitting hole 47 formed at the side of the front support part 31b, i.e., in the curved part of the front side wall 7k. The front fitting hole 47 has a size corresponding to the front end part 29c of the pin 29. The rear end part 29b of the pin 29 is inserted in the rear fitting hole 45, and fixed to a circumference thereof by a weld 55 shown in FIGS. 4 and 5. The front end part 29c of the pin 29 is inserted in the front fitting hole 47, and fixed to a circumference thereof by a weld 55.

The bolting part 44 projecting from the rear end part 29b of the pin 29 extends through the first wing 15a of the torque arm 15. A nut 19 is applied on a projecting part of the bolting part 44 at a rear side of the first wing 15a, and tightened to thereby fix the first wing 15a against the fastening-oriented end face 43.

As shown in FIG. 3, a front fixing part 7b of the lower arm 3 has an elastically operable bush member 48 installed therein. The bush member 48 is fitted on a bolt 53, which has a nut 49 applied thereon. The front fixing part 7b is supported through such elements by an unshown bracket fixed to a vehicle body end, and is vertically swingable about a pivotal axis aligned to the pivotal axis of the rear fixing part 7a of the lower arm 3.

The torque arm 15 has a second wing 15b fastened by a pair of bolts 23, 23 to a flat part of the vertical wall 7h of the rear projection 7e of the rear fixing part 7a of the lower arm 3. The bolts 23, 23 are tightened with nuts 25, 25 applied thereon.

As shown in FIG. 4, the lower arm 3 has a bracket 50 fixed on a top wall 7j thereof, a fixing hole 51 formed in a transversely outer end 7c thereof, and another bracket 52 fixed to a front side thereof. The bracket 50 is provided with a bolt 50a operatively connected to a lower end of an unshown shock absorber. The fixing hole 51 holds a lower ball joint for operatively supporting a lower end of an unshown steering knuckle member. The bracket 52 is connected to an end of an unshown stabilizer.

The lower arm 3 is shaped in a wishbone form in plan for the accommodation to arrangement of an associated front road wheel 60 of the automobile.

According to the present embodiment, a first wing 15a as an end part of a torque arm 15 is fastened and fixed to a pin 29 secured at an end of a lower arm 3, simply by tightening a nut 19. Without a conventional bolt inserted in a collar at a lower arm end, a total number of component parts is reduced, permitting a facilitated assembly work.

The torque arm 15 is allowed for an enhanced assembly accuracy subject to influences simply of a processing accuracy of front and rear holes 47, 45 for fixing the pin 29 to the lower arm 3 and a processing accuracy of holes for fixing a spindle 13 at front and rear support parts 31b, 31a, with eliminated conventional considerations to an assembly error due to a clearance between a bolt and a collar.

There is allowed a reduction in processing accuracy of the fixing holes for spindle 13, permitting a significantly facilitated processing.

The pin 29 is reduced in diameter over an intermediate part 29a thereof, and is shiftable in position toward the spindle 15 without interferences with a bracket 35 fixed to a vehicle body end. In FIG. 6, the pin 29 is shifted to be provided through a flat part of a rear side wall 27, avoiding a location associated with a wall portion inwardly curved by a restriction from a road wheel 60. Such a positional shift facilitates a processing of the rear hole 45. This will be seen when compared with FIGS. 3–5 in which the hole 45 is formed in a curved wall part.

A conventional collar is subject to an even large outside diameter. However, the pin 29 is an enforcement of which an intermediate part 29a is allowed to have an arbitrary diameter irrespective of a size of the hole 45. A flexibility of design is thus increased.

It will be seen that the invention is applicable to a suspension system having a torsion bar coupled to an upper arm. The pin 29 may be fixed to the lower arm 3 by an adequate measure other than welding, e.g. by bonding.

It will also be seen that, according to an aspect of the embodiment, a suspension system includes a suspension arm 3, a spindle member 13, a bush member 37, a torque arm member 15, a torsion bar 11, a pin member 29, and a nut member 19. The suspension arm 3 has a fixing part 7a for a fixing to a vehicle body end 35. The spindle member 13 is provided in the fixing part 7a. The bush member 37 is for coupling the spindle member 13 to the vehicle body end 35. The torque arm member 15 is fastened at an end part 15b to an side wall 27 of the suspension arm 3. The torque arm member 15 includes an intermediate part 15c having a pair of concentrical insert parts 41a, 41b. The spindle member 13 has an end part 13a projecting past the side wall 27 and inserted in one insert part 41 a in an anti-rotational manner. The torsion bar 11 has an end part 11a inserted in the other insert part 41b in an anti-rotational manner.

The pin member 29 is fixed to the fixing part 7a in parallel to the spindle member 13. The pin member 29 has an end part 29b projecting past the side wall 27. The end part 29b is provided with a fastening-oriented surface 43 having a bolting part 44 projecting therefrom. The bolting part 44 extends through another end part 13a of the torque arm member 15. The nut member 19 is applied to the bolting part 44 to fasten the end part 15a of the torque arm member 15 to the side wall 27.

The pin member 29 is formed with a relatively small diameter along a length opposing the spindle member 13 to provide an increased spacing for a coupling of the spindle member 13 to the vehicle body end 35. The end part 29b of the pin member 29, which includes the fastening-oriented surface 43, is formed with a relatively large diameter.

Accordingly, a necessary spacing is secured between the spindle member 13 and the pin member 29, even if the latter 29 is shifted toward the former 13. With the spacing secured, a bracket 35 is kept from interfering with the pin member 29. The pin member 29 can thus be shifted to a location associated with a non-curved wall part of the fixing part 7a, permitting a facilitated processing.

The pin member 29 is welded (55) to the suspension arm permitting a facilitated firm fixing.

The suspension system further comprises an upper arm member 1, and a lower arm member composed of the suspension arm 3 cooperative with the upper arm member for an independent suspension of an associated road wheel 60.

According to another aspect of the embodiment, as illustrated in FIGS. 7A and 7B, a suspension system is provided for a vehicle V having a vehicle body B, a plurality of rigid members (R and 35) secured to the vehicle body, a plurality of road wheels (50), and a plurality of steering knuckle members K each respectively supporting a corresponding road wheel (60). The suspension system comprises a first suspension arm 1, a second suspension arm 3, a shock absorber 9, a torsion bar 11, a torque arm member 15, and a fastening structure. The first suspension arm 1 is vertically swingably operatively connected at an inner end portion 5a, 5b to a first rigid member, and operatively joined at an outer end portion 5c to one end of an associated steering knuckle member. The second suspension arm 3 is vertically swingably operatively connected at an inner end portion 7a, 7b to a second rigid member 35, and operatively joined at an outer end portion 7c to another end of the associated steering knuckle member. The shock absorber 9 is operatively connected at one end 9a to a third rigid member and at another end 9b to an integral part 50 of one 3 of the first and the second suspension arms. The torsion bar 11 is connected at one end part 11b to a fourth rigid member in an anti-rotational manner. The torque arm member 15 holds another end part 11a of the torsion bar 11 to have the torsion bar 11 twisted when the torque arm member 15 is rotated about a rotational axis. The torque arm member 15 has a first extension 15a extending in a radial direction about the rotational axis. The fastening structure is for fastening the torque arm member 15 to a certain one of the inner end portions of the first and second suspension arms 1, 3 to have the torque arm member 15 rotated together with the certain inner end portion when a corresponding suspension arm 3 swings about a pivotal axis. The fastening structure includes a gap between the first extension 15a and a spaced side wall 27 of the certain inner end portion, a pin member 29 fixed to the certain inner end portion, the pin member 29 having an end part 29b projected through the spaced side wall 27 to provide an end face 43 for abutment with one side of the first extension 15a, the end face 43 being formed with a bolting part 44 projecting therefrom, and a nut member 19 applied to the bolting part 44 at another side of the first extension 15a.

The pin member 29 is welded to the certain inner end portion.

The torque arm member 15 has a second extension 15b extending in an opposite direction to the first extension (15a). The fastening structure further includes a bolt member 23 for fastening the second extension 15b to a flat wall 7h of the certain inner end portion.

The certain inner end portion is bifurcated into a first fixing part 7a and a second fixing part 7b spaced from each other in a longitudinal direction L of the vehicle. The first fixing part 7a is vertically swingably operatively connected to the first rigid member 35. The second fixing part 7b is vertically swingably operatively connected to a fifth rigid member. The first fixing part 7a is formed with a first side wall 27 and a second side wall 7k opposing each other in the longitudinal direction L. The first side wall 27 includes the spaced side wall and the flat wall 7h.

The first fixing part 7a is bifurcated into a first projection 7e and a second projection 7d spaced from each other in the longitudinal direction L. The first projection 7e is formed with a first vertical wall 7h extending in a transverse direction T of the vehicle. The first vertical wall 7h including the flat wall. The second projection 7d is formed with a second vertical wall 7f extending in the transverse direction T.

The suspension system further comprises a spindle member 13 and a bush member (37). The spindle member 13 extends in parallel to the pin member 29, and has a first end part 13a provided through the first vertical wall 7h and fixed in a central part 15c of the torque arm member 15 and a second end part fastened to the second vertical wall. The bush member is fitted on the spindle member 13 and supported by the first rigid member 35.

The spindle member 13 has a longitudinal centerline coincident with the rotational axis of the torque arm member 15.

The first end part 13a of the spindle member 13 has a serration engaged with one end of a hollow formed in the central part 15c of the torque arm member 15.

The other end part 11a of the torsion bar 11 has a serration engaged with another end of the hollow.

The pin member 29 has a reduced diameter along a length opposing the bush member 37.

The pin member 29 comprises a diameter-reduced portion 29c, welded (55) to the second side wall 7k of the first fixing part 7a, and a diameter-enlarged portion welded (55) to the first side wall 7h of the first fixing part, the diameter-enlarged portion including the end part 29b of the pin member 29.

The corresponding suspension arm 3 is shaped in a wishbone form.

The first 1 and the second suspension arm 3 are shaped in wishborn forms, respectively.

The first suspension arm 1 and the second suspension arm 3 are substantially parallel to each other.

The pivotal axis of the corresponding suspension arm 3 extends in a longitudinal direction L of the vehicle.

The corresponding suspension arm 3 is a lower one of the first and second suspension arms, and the associated steering knuckle member supports a front road wheel 60.

While preferred embodiments of the present invention have been described using specific terms, such description is for illustrative purposes, and it is to be understood that changes and variations may be made without departing from the spirit or scope of the following claims.

What is claimed is:

1. A suspension system for vehicles including:
   a suspension arm having a fixing part for a fixing thereof to a vehicle body end;
   a spindle member provided in the fixing part of the suspension arm;
   a bush member for coupling the spindle member to the vehicle body end to have the fixing part of the suspension arm supported to the vehicle body end;
   a torque arm member fastened at one of opposite end parts thereof to an outside of the suspension arm, the torque arm member including an intermediate part having a pair of insert parts concentrically provided on opposite sides thereof;
   the spindle member having an end part thereof projecting past the outside of the suspension arm and inserted in one of the insert parts in an anti-rotational manner;
   a torsion bar having an end part thereof inserted in the other of the insert parts in an anti-rotational manner;
   a pin member fixed to the fixing part of the suspension arm in parallel to the spindle member, the pin member having an end part thereof projecting past the outside of the suspension arm, the end part of the pin member being provided with a radially extending fastening-oriented surface having a bolting part projecting therefrom, the bolting part extending through the other of the opposite end parts of the torque arm member; and
   a nut member applied to the bolting part at the end part of the pin member so that the other of the opposite end pails of the torque arm member is fastened to the outside of the suspension arm.

2. A suspension system according to claim 1, wherein:

the pin member is formed with a relatively small diameter along a length thereof opposing the spindle member to provide an increased spacing for a coupling of the spindle member to the vehicle body end; and the end part of the pin member including the fastening-oriented surface is formed with a relatively large diameter.

3. A suspension system according to claim 1, wherein the pin member is welded to the suspension arm.

4. A suspension system according to claim 1, further comprising:

an upper arm member; and a lower arm member composed of the suspension arm cooperative with the upper arm member for an independent suspension of an associated road wheel.

5. A suspension system for a vehicle having a vehicle body, a plurality of rigid members secured to the vehicle body, a plurality of road wheels, and a plurality of steering knuckle members each respectively supporting a corresponding road wheel, the suspension system comprising:

a first suspension arm vertically swingably operatively connected at an inner end portion thereof to a first rigid member, the first suspension arm being operatively joined at an outer end portion thereof to one end of an associated steering knuckle member;

a second suspension arm vertically swingably operatively connected at an inner end portion thereof to a second rigid member, the second suspension arm being operatively joined at an outer end portion thereof to another end of the associated steering knuckle member;

a shock absorber operatively connected at one end thereof to a third rigid member and at another end thereof to an integral part of one of the first and second suspension arms;

a torsion bar connected at one end part thereof to a fourth rigid member in an anti-rotational manner;

a torque arm member for holding another end part of the torsion bar to have the torsion bar twisted when the torque arm member is rotated about a rotational axis thereof, the torque arm member having a first extension extending in a radial direction about the rotational axis; and a fastening structure for fastening the torque arm member to a certain one of the inner end portions of the first and second suspension arms to have the torque arm member rotated together with the certain inner end portion when the corresponding suspension arm swings about a pivotal axis thereof, the fastening structure including:

a gap defined between the first extension and a spaced side wall region of the certain inner end portion;

a pin member fixed to the certain inner end portion, the pin member having an end part thereof projected through the spaced side wall region to provide an end face for abutment with one side of the first extension, the end face being formed with a bolting part projecting therefrom; and a nut member applied to the bolting part at another side of the first extension.

6. A suspension system according to claim 5, wherein the pin member is welded to the certain inner end portion.

7. A suspension system according to claim 5, wherein the torque arm member has a second extension extending in an opposite direction to the first extension; and the fastening structure farther includes a bolt member for fastening the second extension to a flat wall region of the certain inner end portion.

8. A suspension system according to claim 7, wherein:

the certain inner end portion is bifurcated into first and second fixing parts spaced from each other in a longitudinal direction of the vehicle;

the first fixing part is vertically swingably operatively connected to the first rigid member;

the second fixing part is vertically swingably operatively connected to a fifth rigid member; and the first fixing part is formed with first and second side walls opposing each other in the longitudinal direction, the first side wall comprising the spaced side wall region and the flat wall region.

9. A suspension system according to claim 8, wherein:

the first fixing part is bifurcated into first and second projections spaced from each other in the longitudinal direction;

the first projection is formed with the first side wall extending in a transverse direction of the vehicle; and the second projection is formed with the second side wall extending in the transverse direction.

10. A suspension system according to claim 9, further comprising:

a spindle member extending in parallel to the pin member, the spindle member having a first end part thereof provided through the first side wall and fixed in a central part of the torque arm member and a second end part thereof fastened to the second side wall; and a bush member fitted on the spindle member and supported by the first rigid member.

11. A suspension system according to claim 10, wherein the spindle member has a longitudinal centerline thereof coincident with the rotational axis of the torque arm member.

12. A suspension system according to claim 10, wherein the first end part of the spindle member has a serration engaged with one end of a hollow central part of the torque arm member.

13. A suspension system according to claim 12, wherein the another end part of the torsion bar has a serration engaged with another end of the hollow central part.

14. A suspension system according to claim 10, wherein the pin member has a reduced diameter along a length thereof opposing the bush member.

15. A suspension system according to claim 14, wherein the pin member comprises:

a diameter-reduced portion welded to the second side wall of the first fixing part; and a diameter-enlarged portion welded to the first side wall of the first fixing part, the diameter-enlarged portion including said end part of the pin member.

16. A suspension system according to claim 5, wherein the corresponding suspension arm is shaped in a wishbone form.

17. A suspension system according to claim 5, wherein the first and second suspension arms are shaped in wishbone forms.

18. A suspension system according to claim 5, wherein the first and second suspension arms are substantially parallel to each other.

19. A suspension system according to claim 5, wherein the pivotal axis of the corresponding suspension arm extends in a longitudinal direction of the vehicle.

20. A suspension system according to claim 5, wherein:

the corresponding suspension arm is a lower one of the first and second suspension arms; and the associated steering knuckle member supports a front road wheel.

* * * * *